United States Patent [19]

Saforo et al.

[11] Patent Number: 4,923,843

[45] Date of Patent: May 8, 1990

[54] PEPTIZED ACTIVATED CARBON/ALUMINA COMPOSITE

[75] Inventors: Emmanuel K. Saforo, Allison Park; Paul K. T. Liu, Pittsburgh; Robin K. Bergstrom, Natrona Heights; David G. Gatty, Tarentum, all of Pa.

[73] Assignee: Aluminum Company of America, Pittsburgh, Pa.

[21] Appl. No.: 257,873

[22] Filed: Oct. 14, 1988

Related U.S. Application Data

[63] Continuation-in-part of Ser. No. 911,317, Sep. 25, 1986, Pat. No. 4,795,735.

[51] Int. Cl.$^5$ .......................... B01J 20/08; B01J 20/20
[52] U.S. Cl. ........................................ 502/415; 55/74; 210/684; 210/694; 502/417
[58] Field of Search ................ 502/415, 417, 413, 182

[56] References Cited

U.S. PATENT DOCUMENTS 4,499,208  2/1985  Fuderer .............................. 502/415
4,795,735  1/1989  Liu ...................................... 502/415

Primary Examiner—Paul E. Konopka
Attorney, Agent, or Firm—Andrew Alexander

[57] ABSTRACT

Disclosed is a novel activated carbon/alumina composite and a method of preparing the same. The method includes providing a blend containing alumina powder, peptizing agent, water and activated carbon powder and mixing the blend to peptize the alumina and form an aqueous mixture. A green body is then formed from the mixture, dried and heated to form the activated carbon-/alumina composite.

41 Claims, 2 Drawing Sheets

PEPTIZED ACTIVATED CARBON/ALUMINA COMPOSITE

CROSS-REFERENCE TO RELATED APPLICATION

This application is a continuation-in-part of U.S. Ser. No. 911,317, filed Sept. 25, 1986, now U.S. Pat. No. 4,795,735 incorporated herein by reference.

BACKGROUND OF THE INVENTION

1. Field of the Invention

This invention relates to adsorbents and more particularly, it relates to a peptized activated carbon/alumina composite and method of preparing the same suitable for us in adsorption processes.

2. Description of the Related Art

The use of activated carbon is considered to be one of the most economical methods for treating water for the removal of a wide range of pollutants. Its heterogeneous pore structure is suitable for removing most waste water pollutants although its capacity for an individual pollutant varies.

Activated carbon is used in drinking water treatment for removing organic pollutants including objectionable taste and odor. Although it is able to adsorb some inorganic molecules, e.g., phosphates and chromates, adsorption sites available for these components are quite limited. Because of lack of capacity for inorganic materials, the adsorber service life is shortened although the overall saturation capacity may not be reached for the organic material.

In gas separation and purification, activated alumina has been used very frequently to remove trace molecules such as carbon dioxide and ammonia, because activated alumina has a high adsorption capacity for these materials at low concentration ranges. However, gas waste streams often contain other pollutants, such as non-polar hydrocarbons, e.g., methane, which activated alumina only weakly adsorbs. This requires an additional step for removal of such organic materials. Thus, it will be understood that there is a great need for an adsorption material which would adsorb both kinds of pollutants.

In the prior art, U.S. Pat. No. 4,499,208 discloses activated carbon pellets suitable for use in the adsorbent beds of pressure swing adsorption systems. The carbon pellets are prepared by mixing a volume-based higher heat capacity, inert inorganic material with a partially activated carbon powder prior to pelletizing of the powder. Dense alumina in the form of corundum is used for this purpose. However, the activated carbon in the form of powder is treated by the addition of a binder, such as pitch, bitumen, tar and tar oil, followed by pelletizing of the powder-binder mixture. The resulting doped adsorbent is designed to enhance the operation of adiabatic pressure swing adsorption processes by decreasing the cyclic temperature change in the adsorbent bed during each processing cycle of the process.

U.S. Pat. No. 1,530,392 discloses a process for making compound adsorbent catalysts wherein the active catalytic components are introduced into a charcoal body which generally serves as a carrier but sometimes is capable of functioning as a catalyst as well as a carrier or adsorbing agent. According to the patent, the active catalytic components are metallic and other elementary substances, including aluminum, zinc, cobalt, copper, etc., and oxides and other compounds of these metals.

U.S. Pat. No. 2,662,860 discloses a method for making a molded alumina carrier for a catalyst which comprises mixing alumina trihydrate with an aluminum salt of a strong acid, e.g., $AlCl_3$, and water; and extruding the mixture into pellets which are then dried and heated to a temperature above 200° C.

U.S. Pat. No. 3,135,696 discloses a process for the preparation of aluminum oxide and carbon based briquettes for reducing the aluminum oxide with carbon.

U S. Pat. No. 3,158,578 teaches a method for preparing an activated alumina which is useful in bleaching refined cottonseed oil which comprises treating activated alumina with an aqueous solution of sulfurous acid until the alumina is saturated and then drying the treated alumina.

U.S. Pat. No. 3,658,724 discloses an adsorbent oxidation catalyst comprised of an adsorbent which can be a non-combustible refractory of high surface area, such as silica, alumina or activated carbon, mixed with such refractory. However, the adsorbent has an oxidation catalyst incorporated therein or on its outer surfaces.

U.S. Pat. No. 3,842,014 discloses graphite-alumina pellets consisting essentially of a gas or vacuum ground graphite of surface area 50 to 2000 square meters per gram, and, as a binder, alumina of pseudoboehmite structure of crystalline size less than 10 manometers and of surface area 200 to 600 square meters per gram.

U.S. Pat. Nos. 3,941,719 and 3,944,658 (both divisions of Ser. No. 281,434.) describe a method of making a transparent activated nonparticulate alumina by hydrolyzing aluminum alkoxides, treating the hydrolyzed slurry with an acid or a salt to peptize it, heat treating the peptized aqueous slurry above 80° C. until a clear solution is formed, forming a gel either by further heating of the solution or by treating it in an organic base such as urea, and then pyrolyzing the gel at a temperature of 500° to 1200° C. to remove water and residual carbon.

U.S. Pat. No. 4,113,661 discloses a method for making a porous catalyst carrier by treating alpha-alumina monohydrate with a monobasic acid such as nitric acid and then neutralizing the acid with a base such as aqueous ammonia. The resulting material is fed to an extruder, and the extrudate is then dried and calcined.

U.S. Pat. No. 4,140,773 describes a method for making alumina spheres by hydrolyzing aluminum alkoxides and then drying the hydrolyzed alumina to a powder which is then dropped onto a rotating wheel under a peptizing spray, such as nitric acid, acetic acid, formic acid, etc., which is misted onto the wheel, resulting in the formation of spheroidal alumina.

U.S. Pat. No. 4,277,376 describes the formation of a monolithic catalyst support by mixing colloidal gamma alumina, alpha alumina and ceramic fibers with fluidizing and binding agents, water and mineral acid in an amount sufficient to convert the alpha alumina into a gel. The mass is then formed into a body of the desired shape which is dried to substantially remove the added water and then heat treated at 800° to 1000° C.

U.S. Pat. No. 4,705,767 teaches the addition of surface active agents to an acid-peptized alumina. The alumina is peptized with nitric acid, acid nitrates such as aluminum nitrate, acetic acid or formic acid. The acid peptized paste may be subsequently neutralized with ammonium hydroxide. The acid peptized paste is then mixed with a cationic, anionic or nonionic surfactant prior to extrusion.

U.S. Pat. No. 4,058,483 discloses an adsorptive material, useful for removing substances from gases and liquids, in discrete pieces, each comprising an adsorptive carbon and an inorganic adsorptive oxide in a mutual weight proportion between 1:5 and 5:1 and the discrete pieces having been formed by a wet method.

Japanese Pat. No. 60,087,853 discloses a heat resistant adsorbent for hydrocarbon content of exhaust gas which consists of granular activated charcoal, the surface of which is coated with porous alumina. The adsorbent is made from a slurry of boehmite alumina, water and nitric acid to which is added powdered gamma alumina. Thereafter, 2 to 5 mm granular activated charcoal is coated by immersion in the slurry mixture.

The present invention provides an improved adsorbent comprised of activated carbon/alumina formed by peptizing a mixture of alumina and activated carbon.

SUMMARY OF THE INVENTION

It is an object of the present invention to provide a peptized activated carbon/alumina composite.

It is another object of the present invention to provide a green body of peptized alumina and activated carbon.

It is yet another object of the present invention to provide high adsorbing bodies of activated alumina and activated carbon formed from a mixture of activated carbon and peptized alumina.

And yet it is another object of the present invention to provide a composite capable of removing organic and inorganic contaminants from waste streams.

And yet it is a further object of the present invention to provide a process for removing metallic ions and organic contaminants from waste liquids using a peptized activated carbon/alumina composite.

And it is yet a further object of this invention to provide a process for removing polar and non-polar contaminants from gaseous waste streams using a peptized activated carbon/alumina composite.

These and other objects will become apparent from the drawings, specification and claims appended hereto.

In accordance with these objects, there is provided a peptized activated carbon/alumina composite suitable for use as an adsorbent in purifying liquid or gaseous streams, for example, and a method of preparing the same comprising peptizing a blend of alumina powder and activated carbon powder to form a mix. A green body is formed from the mix, and the green body is heated to dry the body, followed by calcination to provide the activated carbon/alumina composite.

DETAILED DESCRIPTION OF THE PREFERRED EMBODIMENTS

Figure 1:
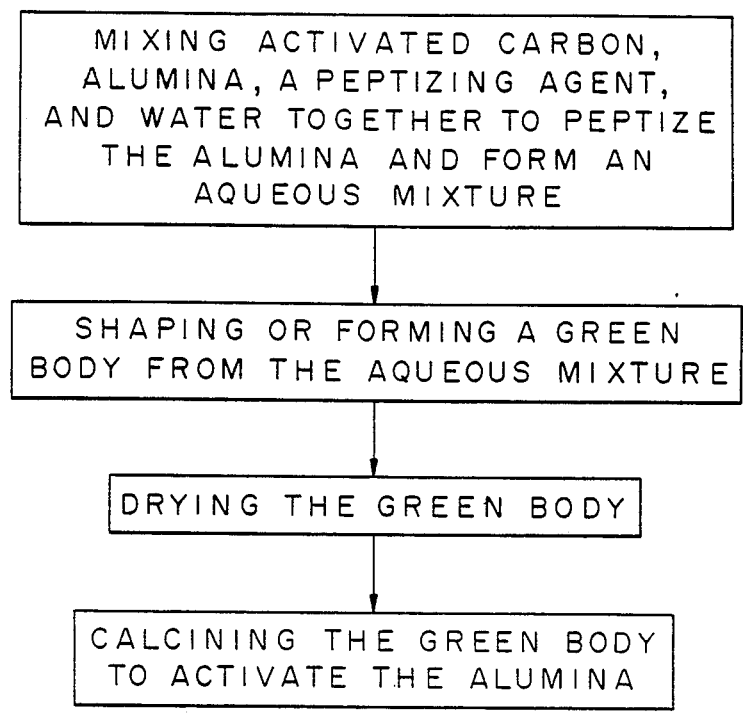
FIG. 1 is a flow sheet illustrating the process of the invention.

The composite formed in accordance with the invention may be initially prepared by first blending together alumina powder, peptizing agent, water and activated carbon powder to provide a homogeneous mixture thereof. Alumina, such as gamma alumina, is not desirous since it only serves to weaken the alumina bonding in the matrix.

Activated carbon, as used herein, can include carbonaceous material, such as lampblack, charcoal, sugar charcoal, carbon produced from oil products and the like, which remain after heating or partial burning and undergoes activation when carbon is treated with steam, for example. Other activation processes known in the art may also be used. For use in the present invention, the activated carbon powder can have a particle size in the range of 0.5 to 500 $\mu$m, preferably 1 to 300 $\mu$m. The subject composite is much less sensitive to pore volume with respect to the activated carbon phase and thus provides one of the advantages over the use of either constituent alone. That is, activated alumina as a binder does not result in a loss of pore volume in activated carbon. By comparison, the use of an organic binder for activated carbon results in the loss of pore volume. The pore volume of the activated carbon can be as low as 0.1 cc/gm, for example, with the higher levels of pore volume, for example, 5.0 cc/gm or higher, but preferably less than 2.5 cc/gm, not presently known to be detrimental.

Alumina useful in the present invention may comprise any hydrated alumina, e.g., alumina trihydrate, preferably boehmite (the use of boehmite herein includes pseudo-boehmite), having a particle size as high as 200 $\mu$m but average particle size should be in the range of 0.1 to 100 $\mu$m, preferably 1.0 to 50 $\mu$m, and typically 1 to 10 $\mu$m, e.g., about 5 $\mu$m. As used herein, the expression "alumina hydrate" refers to $Al_2O_3 \cdot xH_2O$ where x varies from 1 to 3. The water of the alumina hydrate varies from 15.0 to 34.6 percent by weight of the alumina hydrate, determined by calcination at 538° C. (1000° F.) for one hour. Rehydration bondable alumina such as described in U.S. Pat. No. 4,579,839, incorporated herein by reference, may be used in the initial mixture in addition to the peptized alumina, particularly where it is desired to have low levels of alumina and additional bonding or crush strength. However, since it is necessary for the alumina to be in hydrated form prior to peptizing, the use of activated alumina as a starting ingredient would not be economically expedient.

The peptizing agent conveniently may comprise nitric acid. However, other known peptizing agents may be used including, but not limited to, phosphoric acid, hydrochloric acid, formic acid, acetic acid and acid salts such as aluminum nitrate.

The amount or ratio of the ingredients in the initial blend, based on total weight of activated carbon, alumina, peptizing agent and water, may range from 5 to 90 wt. %, preferably 40 to 85 wt. %, activated carbon; 5 to 90 wt. %, preferably 5 to 50 wt. %, and suitably 5 to 20 wt. % alumina; 2 to 30 wt. %, preferably 15 to 25 wt. %, peptizing agent; balance water, typically in the range of 10 to 50 wt. % water. A typical blend would be about 70 to 85 wt. % activated carbon, 5 to 30 wt. % alumina, 20 to 30 wt. % peptizing agent (in the form of 19 wt. % nitric acid), and 30 to 40 wt. % water.

Figure 2:
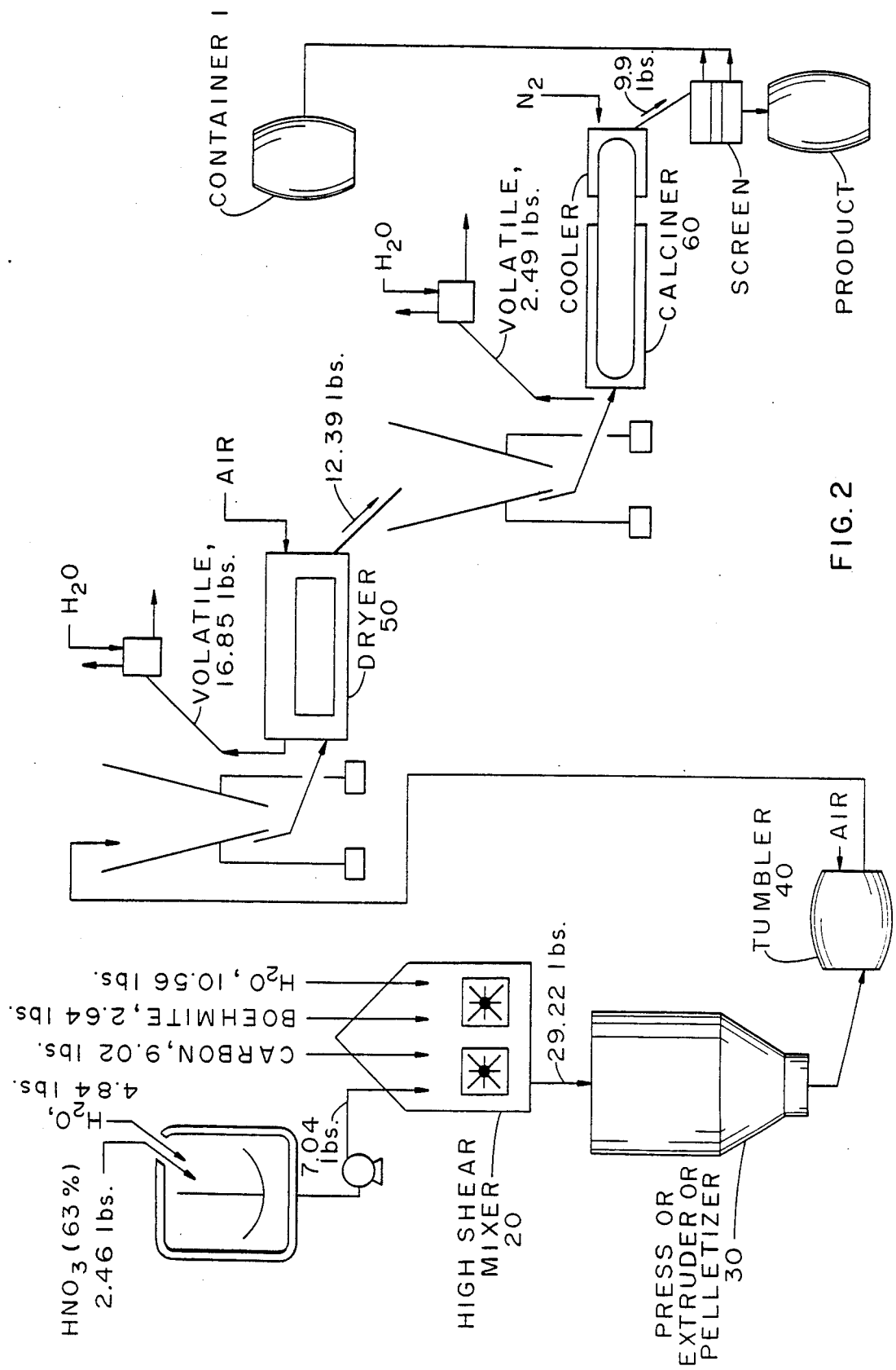
FIG. 2 is a diagrammatic depiction of the apparatus used in carrying out the process of the invention.

This blend is thoroughly mixed in a mixer such as a high shear mixer as shown at 20 in FIG. 2, for a period of from at least about 10 to about 100 minutes to blend the materials together and to ensure that the carbon powder is thoroughly dispersed throughout the mixture. The mixing time also allows the peptizing agent to react with the alumina.

After the blending and peptizing step, the mix is then subjected to a shaping or forming process, for example, using an extruder such as shown at 30 in FIG. 2, wherein the material may be extruded using about 7250 to 14500 psi pressure to provide a green body. That is, after forming as by extruding into strands, the green body has sufficient dimensional stability for handling purposes.

The green body may then be air dried, for example, in tumbler 40, as shown in FIG. 2, at room temperature while flowing a stream of air through the tumbler. The green body may then be further air dried at an elevated temperature of from about 60° to 150° C., preferably about 90° to 120° C., and most preferably about 90° C., in a dryer such as, for example dryer 50 in FIG. 2, for a period of from about 1 to 4 hours, preferably at least about 2 hours to remove all moisture from the green body.

Finally, the now dried green body is calcined, as shown at 60 in FIG. 2, in a nonreactive or inert atmosphere, such as nitrogen or argon, at a temperature of from at least 425° up to 650° C. for a period of from at least about 20 minutes, preferably 30 minutes, up to about 45 minutes at the calcination temperature. To avoid damage to the composite as it is heated to calcination temperature, the temperature is preferably raised slowly at a rate of not more than about 2° C. per minute up to about 250° C., and not more than 3° C. per minute from 250° C. up to the calcination temperature. The calcined composite is then allowed to cool while maintaining the inert or nonreactive atmosphere at least until the composite has cooled to a temperature of about 110° C.

The result is a cementitious composite containing both activated alumina and activated carbon. That is, these activated adsorbents are bound together in the alumina matrix wherein the carbon particles are uniformly dispersed throughout.

In the present invention, it is important that the carbon surface be wettable by the peptizing agent/water aqueous solution. Thus, a dispersant may be used to enhance the wettability of the carbon surface. A suitable dispersant is Nopcosperse 44, available from Diamond Shamrock, or Darvan 821, available from R. T. Vanderbilt. The addition of such dispersant promotes wettability of the carbon surface by the aqueous solution which results in a homogeneous mix with carbon powder particles uniformly dispersed therein and suitable for forming. The amount of dispersant added is in the range of 0.05 to 0.5 wt. % based on the weight of solids present. A preferred amount of dispersant is in the range of 0.07 to 0.3 wt. %.

While it may not be necessary to the use of the activated carbon/alumina composite as a sorbent, e.g., adsorbent or absorbent, e.g., desiccant; dopants, such as zeolites, resins, binders and fillers may be used with or without water to change the properties of the composite.

Composites fabricated in accordance with the present invention have the advantage that small, weakly adsorbable (primarily polar) components can be adsorbed well by activated alumina contained in the composite, particularly in the low concentration range. The competition effect by molecules strongly adsorbable by activated carbon is minimized or no longer exists, while competition from other alumina adsorbable components is present only to a lesser extent. In addition, the composite total adsorption capacity for organic pollutants in water is reduced because of the use of activated alumina; however, its breakthrough capacity is comparable to activated carbons alone. The composite of the present invention has the advantage that it has a low regeneration cost which allows more frequent regeneration. Also, in the composite, activated carbon responsibilities are limited to the removal of non-polar or large molecules; consequently, it is not necessary to have a large capacity of micropore volume for the removal of weakly adsorbable polar components. This permits a low temperature, e.g., less than 500° C., regeneration of the activated carbon/alumina composite inside the adsorber. Thus, there is no oxidation loss during thermal regeneration.

The activated carbon/alumina composite formed in accordance with the invention may be fabricated by means of extrusion, agglomeration or pelletization. Due to the peptizing of the alumina, the alumina serves as a binder as well as an adsorbent. Additional binders may be added, if necessary, to reinforce particle strength for the composite containing a low ratio of alumina.

To further illustrate the invention, samples of the peptized alumina/activated carbon composite were prepared by first mixing together 4.84 lbs of $H_2O$ with 2.46 lbs of concentrated (63 wt. %) nitric acid to form a 19.3 wt. % nitric acid mixture. Then into a high shear mixer was added 9.02 lbs of CECA activated carbon having an average particle size of 15 $\mu$m, 2.64 lbs of Condea Pural SB (alumina trihydrate boehmite) having an average particle size of 50 $\mu$m, 7.04 lbs of the 19 wt. % nitric acid solution and 10.56 lbs of water. The blend was mixed together for 45 minutes.

The resulting product was then extruded as pellets at a pressure of about 20 to 4000 psi. The pellets were air dried at room temperature in a tumbler for 10 minutes while blowing sufficient air through the tumbler to prevent the pellets from sticking to one another. The pellets were then air dried in a dryer at a bed depth of about 2-3 inches at a temperature of from 25° to 60° C. for about 120 minutes while moving through a first zone and then moved to a second zone where they were dried for 120 minutes at a temperature of from 60° to 110° C. until the moisture content was about 15 to 20 wt. %.

The dried product was then calcined under a nitrogen blanket in a 3 to 5 inch bed depth in a calciner while ramping the temperature up to 550° C. over a period of about 45 minutes. The product was maintained at 550° C. over a period of about 45 minutes. The product was maintained at 550° C. for 30 to 120 minutes and then cooled to 110° C. while maintaining the nitrogen atmosphere.

To further test the effect of moisture content, acid level, particle size and calcination on crush strength, samples of activated carbon/alumina adsorbent were prepared having moisture content ranging from 55 to 66 wt. %, particle sizes ranging from 4 to 15 microns, and using, respectively, two acid levels, identified in the table below as H or L. Crush strength referred to is determined in accordance with ASTM test procedure D-3313, incorporated herein by reference, and is measured in lbs for ⅛ inch diameter extrudate. The carbon to alumina weight ratios of all the samples were 80 wt. % carbon per 20 wt. % alumina. The results are tabulated below.

TABLE I

| Sample Number | Solids Content (Al₂O₃ and C) wt. % Calculated Moisture | HNO₃ Acid Conc. | Carbon Particle Size μm | Calc. Temp. °C. | Crush (in lbs.) for ⅛" Extrudate* |
| --- | --- | --- | --- | --- | --- |
| 1 | 37 | 7.7 | 10 | 425 | 25.7 |
| 2 | 35 | 7.7 | 4 | 425 | 34.8 |
| 3 | 34 | 2.6 | 4 | 425 | 4 |
| 4 | 37 | 7.7 | 10 | 550 | 34 |
| 5 | 35 | 7.7 | 4 | 550 | 37.5 |
| 6 | 34 | 2.6 | 4 | 550 | 2 |
| 7 | 43 | 7.7 | 15 | 425 | 7.6 |
| 8 | 45 | 7.7 | 15 | 425 | 16.8 |
| 9 | 45 | 7.7 | 15 | 550 | 25.3 |

The results show, with the exception of sample 7, that the use of the higher levels of nitric acid peptizing agent results in a higher crush strength for the adsorbent. Activated carbon has the capacity to adsorb up to about 0.94 wt. % phenol from a solution containing $1.0 \times 10^{-4}$ moles/l of phenol at a pH=4 and at the same time has very little capacity for inorganic compounds, such as potassium dichromate. Activated alumina, on the other hand, does not adsorb phenol contained in this solution. However, activated alumina has about 1 wt. % capacity for adsorbing potassium dichromate at a pH=4. Thus, it will be seen that the activated carbon/alumina composite of the invention would have the ability to remove both phenol and potassium dichromate from waste streams. The capacity for each component should be proportional to the percent of the activated material in the composite.

Similarly, in the gas phase streams, activated alumina has high capacity for adsorption of $CO_2$, for example, and activated carbon does not at low concentrations of $CO_2$. Activated carbon, however, has high adsorption capacity for organic materials, e.g., methane. Thus it will be appreciated that a composite in accordance with the present invention has the capacity to remove both types of material where the individual components do not.

It will be appreciated that it is the blend, or mix of activated carbon and peptized alumina with the carbon powder particles uniformly dispersed throughout, that is so important in the present invention. That is, by having the carbon particles dispersed in alumina, the resulting green body can be calcined to provide a body having a very high crush strength and yet performs excellently as an adsorbent or desiccant. Further, alumina matrix provides the structure for holding the particles of activated carbon powder in place as well as selectively adsorbing certain constituents. Thus, alumina is not so functional in the present invention as to provide abrasion resistance or heat protection for the carbon. The composite is not desirable for high temperature application such as in automotive exhaust fumes because the carbon is not protected. Rather, the composite is most useful at room temperature or warm streams which do not degrade the activated carbon.

While the invention has been described in terms of preferred embodiments, the claims appended hereto are intended to encompass other embodiments which fall within the spirit of the invention.

What is claimed is:

1. A process of preparing an activated carbon/alumina cementitious composite comprising the steps of:

(a) providing a blend containing alumina hydrate powder and activated carbon powder having an average particle size in the range of 0.5 to 500 μm;
   (b) adding to said blend a peptizing agent and water to form a mixture, the carbon powder being dispersed in the mixture;
   (c) forming a green body from said mixture; and
   (d) heating the green body to form the activated carbon/alumina cementitious composite having said carbon powder particles uniformly dispersed therethrough and having a crush strength of at least 10 lbs. for a ⅛ inch diameter extrudate.

2. The process in accordance with claim 1 wherein the activated carbon has an average particle size in the range of 1 to 300 μm.

3. The process in accordance with claim 1 wherein the activated carbon has a pore volume of at least 0.1 cc/gm.

4. The process in accordance with claim 1 wherein the activated carbon has a pore volume of up to 5.0 cc/gm.

5. The process in accordance with claim 1 wherein the activated carbon has a pore volume of up to 2.5 cc/gm.

6. The process in accordance with claim 1 wherein the alumina has an average particle size in the range of 0.1 to 200 μm.

7. The process in accordance with claim 1 wherein the alumina has an average particle size in the range of 0.1 to 100 μm.

8. The process in accordance with claim 1 wherein the alumina has an average particle size in the range of 0.1 to 50 μm.

9. The process in accordance with claim 1 wherein the alumina has an average particle size in the range of 0.1 to 10 μm 10. The process in accordance with claim 1 wherein said blend contains alumina in the range of 5 to 90 wt. %.

11. The process in accordance with claim 1 wherein said blend contains alumina in the range of 5 to 50 wt. %.

12. The process in accordance with claim 1 wherein the blend contains alumina in the range of 5 to 20 wt. %.

13. The process in accordance with claim 1 wherein the blend contains activated carbon in the range of 5 to 90 wt. %.

14. The process in accordance with claim 1 wherein the blend contains activated carbon in the range of 40 to 85 wt. %.

15. The process in accordance with claim 1 wherein the blend contains peptizing agent in the range of 2 to 30 wt. %.

16. The process in accordance with claim I wherein the blend contains a nitric acid peptizing agent in the range of 20 to 30 wt. % of an aqueous mixture of 19 wt. % nitric acid.

17. The process in accordance with claim 1 wherein a dispersant is added to enhance the wettability of the carbon powder in the aqueous mixture.

18. The process in accordance with claim 1 wherein the amount of dispersant is in the range of 0.05 to 0.5 wt. %.

19. The process of claim 1 wherein said heating step comprises the steps of drying and calcining said green body.

20. The process of claim 1 wherein said heating step includes drying said green body at a temperature in the range of 40° to 400° C. for a period of about 1 to 4 hours.

21. The process of claim 1 wherein said heating step includes drying said green body at a temperature in the range of 60° to 150° C. for a period of about 1 to 4 hours.

22. The process of claim 1 wherein said alumina is boehmite alumina.

23. The process of claim 19 wherein after said drying step, the green body is calcined under a nonreactive atmosphere at a temperature of about 400° to 800° C. for at least 10 minutes.

24. The process of claim 19 wherein after said drying step, the green body is calcined under a nonreactive atmosphere at a temperature of about 425° to 650° C. for at least 10 minutes.

25. The process of claim 19 wherein said heating step further comprises the steps of drying said green body at a temperature of from about 90° to about 120° C. for a period of from about 2 to about 4 hours, and then calcining said dried green body under an inert or nonreactive atmosphere at a temperature of from about 425° to about 650° C. for from about 30 to 45 minutes.

26. The process of claim 19 wherein said calcination step further comprises raising the temperature up to about 250° C. at a rate not exceeding about 2° C. per minute and then raising the temperature from 250° C. up to the calcination temperature at a rate not exceeding about 3° C. per minute.

27. A process of preparing an activated carbon/alumina cementitious composite comprising the steps of:
  (a) providing a blend consisting essentially of boehmite alumina powder and activated carbon powder having a particle size in the range of 0.1 to 300 μm and a pore volume of 0.1 to 2.5 cc/gm and the alumina having a particle size of 0.1 to 50 μm and being present in the blend in the range of 5 to 50 wt. %;
  (b) adding to said blend a peptizing agent and water to form a mixture, the carbon powder being dispersed in the mixture;
  (c) forming a green body from said mixture;
  (d) drying said green body at a temperature in the range of 40° to 400° C.; and
  (e) calcining the green body at a temperature in the range of 400° to 800° C. to form the activated carbon/alumina cementitious composite having said carbon powder particles uniformly dispersed therethrough and having a crush strength of at least 10 lbs. for a ⅛ inch diameter extrudate.

28. A calcined activated carbon/alumina cementitious composite suitable for use as a sorbent at about ambient temperature, the cementitious composite having activated carbon uniformly dispersed therein and present in an amount in the range of 5 to 90 wt. %, the composite resulting from a mixture of activated carbon powder having a particle size in the range of 0.5 to 500 μm and peptized boehmite alumina powder with water added thereto formed into a green body and heated for a time sufficient to increase the strength thereof and form said calcined activated carbon/alumina cementitious composite, having a crush strength of at least 10 lbs. for a ⅛ inch diameter extrudate.

29. The composite in accordance with claim 28 wherein said activated carbon has a pore volume of at least 0.1 cc/gm.

30. The composite in accordance with claim 28 wherein said activated carbon has a pore volume of up to 5.0 cc/gm.

31. The composite in accordance with claim 28 wherein said activated carbon has a pore volume of up to 2.5 cc/gm.

32. The composite in accordance with claim 28 wherein said alumina powder has a particle size in the range of 0.1 to 200 μm.

33. The composite in accordance with claim 28 wherein said alumina powder has a particle size in the range of 0.1 to 100 μm.

34. The composite in accordance with claim 28 wherein said alumina powder has a particle size in the range of 0.1 to 50 μm.

35. The composite in accordance with claim 28 wherein said alumina powder has a particle size in the range of 0.1 to 10 μm.

36. The composite in accordance with claim 28 wherein said composite contains alumina in the range of 5 to 90 wt. % of said composite.

37. The composite in accordance with claim 28 wherein said composite contains alumina in the range of 5 to 50 wt. % of said composite.

38. The composite in accordance with claim 28 wherein said composite contains alumina in the range of 5 to 20 wt. % of said composite.

39. The composite in accordance with claim 28 wherein the activated carbon is in the range of 5 to 90 wt. %.

40. The composite in accordance with claim 28 wherein the activated carbon is in the range of 40 to 85 wt. %.

41. A calcined activated carbon/alumina cementitious composite suitable for use as a sorbent at about ambient temperature, the cementitious composite having activated carbon uniformly dispersed therein and present in an amount in the range of 5 to 90 wt. % and having a pore volume of 0.1 to 2.5 cc/gm, the composite resulting from a mixture of activated carbon powder having a particle size in the range of 0.5 to 300 μm and peptized boehmite alumina having a particle size less than 50 μm with water added thereto, formed into a green body and heated for a time sufficient to increase the strength thereof and form said calcined activated carbon/alumina cementitious composite, having a crush strength of at least 10 lbs. for a ⅛ inch diameter extrudate.

* * * * *